Patented June 22, 1954

2,681,860

UNITED STATES PATENT OFFICE 2,681,860

MOLD AND MOLD COMPOSITION

Edwin Clements Rhodes, Ealing, London, and Peter Edward Gainsbury, Northolt, England, assignors to The International Nickel Company, Inc., New York, N. Y.

No Drawing. Application January 8, 1952, Serial No. 265,526

Claims priority, application Great Britain January 9, 1951

4 Claims. (Cl. 106—38.3)

This invention relates to the manufacture of refractory molds for use in casting metal jewelry and other metal articles, to compositions from which such molds may be made, and to the molds made therefrom.

One variety of refractory mold that is particularly suitable for use in casting metal jewelry and other metal articles to a precise size and shape can be made by forming a highly refractory powdered material, e. g. silica in various forms and sillimanite, into a slurry. This slurry is used to surround a pattern, appropriate steps being taken to ensure that it is in intimate contact with every part of the pattern surface. The slurry sets around the pattern to form what is often called an investment mold. The pattern is often made of wax and removed by melting after the mold has been formed.

The liquid constituent of the slurry generally contains a dissolved substance which acts as a binder for the refractory particles. Among the binders commonly used are solutions of organic silicates, though aqueous and other solutions of various inorganic salts (including water-soluble phosphates) have been proposed.

It is an object of this invention to provide improved refractory slurries which will more readily flow into small interstices of patterns than the slurries used hitherto.

It is another object to reduce the amount of liquid required to produce a free-flowing slurry for the manufacture of an investment mold.

It is a further object of this invention to provide refractory molds having improved resistance to thermal shock.

Yet another object of the invention is to provide a dry investment composition capable, on the addition of water, of forming a free-flowing slurry which will set to form an investment mold.

We have discovered that if the slurry from which an investment mold is made contains sodium hexametaphosphate, the manufacture of the mold is much facilitated. According to our invention, therefore, the refractory material is formed into a slurry with water and sodium hexametaphosphate. Sodium hexametaphosphate is an easily soluble solid, and in the slurry it is present as a dilute aqueous solution.

We find that a number of advantages accrue from the use of sodium hexametaphosphate. First, the ratio of liquid to powder necessary to give a pourable slurry is reduced, thereby facilitating setting, as there is less surplus liquid to be removed and closer packing of the refractory grains is obtained.

Next, mixtures of refractory powders with dilute sodium hexametaphosphate solutions, even at low liquid contents, are very mobile and non-plastic, thus readily filling the small interstices of patterns very easily. By contrast, the mixtures commonly employed must often be vibrated if they are to enter the small interstices.

With some powders, slurries formed with sodium hexametaphosphate rapidly separate into solid and liquid on standing, so that surplus liquid can be decanted from the top of the mold, again reducing the setting time.

In addition, molds made according to the invention have excellent resistance to thermal shock and in this respect are generally better than the molds commonly used.

We believe that the hexametaphosphate does not act in the same way as the liquids hitherto proposed as binders, but rather serves to bring the powder particles into very intimate contact in the final investment mold. Our reasons for saying this are that the quantities of sodium hexametaphosphate required are much smaller than those of the phosphates hitherto proposed as binders, that under otherwise identical conditions the slurry will set if no sodium hexametaphosphate is used at all, and that in the absence of sodium hexametaphosphate the advantages listed above are not obtained. Whatever the exact action of sodium hexametaphosphate, it is unique in its behaviour as a constituent of a slurry used to form an investment.

Ordinary commercial grades of sodium hexametaphosphate may be used. The amount preferred is in general from 0.01% to 2% of the refractory material by weight, though this amount depends to some extent on the nature and fineness of the refractory material. The sodium hexametaphosphate may be used either as an aqueous solution or as a constituent of a powder mixture to which water is added to form the slurry. It is desirable in any case to use the minimum amount of water which will form a free-flowing slurry upon thorough mixing, the exact amount also depending upon the nature and fineness of the powdered refractory material.

The refractory material must, of course, resist attack by the molten metal to be cast into the mold. It is necessary to choose a refractory material substantially free from any constituent which reacts with water or with sodium hexametaphosphate. Therefore the refractory material must be substantially free from calcium sulphate (which reacts with water) or magnesia (which reacts with sodium hexametaphosphate).

The preferred refractory materials are silica, sillimanite and zircon, but, subject to what has been said above, other refractory oxides or silicates may be used.

As one example, we use silica powder (the $SiO_2$ content of which should be at least 99%) and grind it to a fineness such that 99% will pass through a sieve having 250 meshes to the linear inch, the average particle size being from 3 to 5 microns. We mix this powder with an aqueous solution of sodium hexametaphosphate containing 0.25% sodium hexametaphosphate by weight, in the proportion of 100 grams of powder to 34 ml. of solution. Thus, the sodium hexametaphosphate amounts to 0.085% of the silica by weight. The mixing is effected mechanically for at least 10 minutes, the fluidity increasing as the mixing continues. The resultant mixture is a slurry which is poured around one or more wax patterns mounted on absorbent asbestos board within a ring of heat-resisting metal. This ring is prolonged upwards by a paper extension, and the ring and extension are filled with the slurry. Liquid will separate from the slurry as a supernatant layer within the paper extension, and after about two hours this liquid is decanted. Thirty minutes later the extension is cut off level with the top of the metal ring. The investment mold so produced is dried in the usual way, e. g. by being heated for periods of half an hour each at successively increasing temperatures, say 100° C., 200° C. and 300° C., and thereafter being raised to 800° C. in the course of one hour. The investment mold is then held at 800° C. for 30 minutes or more, and thereafter allowed to cool. The wax melts and is evacuated from the mold during the drying.

As an example of the use of a dry composition, we may grind sodium hexametaphosphate and silica powder together in the same proportion of 0.085% by weight as in the preceding example and then mix the resultant mixed powder with water in the proportion of 100 grams of powder to 34 ml. of water, the procedure thereafter being the same as in the preceding example.

To illustrate some of the advantages of the invention, one grade of silica of 98% total $SiO_2$ content, and of such a fineness that 97% passed through a 300 mesh sieve (300 meshes to the linear inch), required 50 mls. of distilled water per 100 grams of powder to produce a slurry, and the fluidity of this slurry was low. When a 0.5% aqueous solution of sodium hexametaphosphate was used instead of water, only 30 mls. per 100 grams of powder were required to produce a slurry with excellent flowing properties. In this case the proportion of sodium hexametaphosphate to refractory material by weight was 0.15%.

With a very fine sillimanite powder the drop in liquid content required to form a slurry when using a 2% sodium hexametaphosphate solution instead of water was from 41 mls. per 100 grams to 33 mls. per 100 grams with markedly improved flowing properties. In this case the proportion of sodium hexametaphosphate to refractory material by weight was 0.66%.

With a very fine zircon powder the drop in liquid content required to form a slurry when using a 2% sodium hexametaphosphate solution instead of water was from 38.5 mls. per 100 grams to 27.5 mls. per 100 grams, again with improved flowing properties. In this case the proportion of sodium hexametaphosphate to refractory material by weight was 0.55%.

It will be observed that in all these examples the amount of sodium hexametaphosphate required is very small.

We claim:

1. A powdered composition for use in forming an investment in metal casting consisting essentially of a refractory material intimately mixed with a small proportion of sodium hexametaphosphate in amounts ranging from about 0.01% to 2% by weight of refractory material.

2. A powdered composition for use in forming an investment in metal casting consisting essentially of a refractory material selected from the group consisting of silica, sillimanite and zircon intimately mixed with sodium hexametaphosphate amounting to from 0.01 to 2% of said refractory material by weight.

3. A mold for use in casting metals, said mold consisting essentially of a refractory material and a small proportion of sodium hexametaphosphate, said sodium hexametaphosphate amounting to from about 0.01% to 2% by weight of the refractory material.

4. A mold for use in metal casting consisting essentially of a refractory material selected from the group consisting of powdered silica, sillimanite and zircon intimately mixed with sodium hexametaphosphate, said sodium hexametaphosphate amounting to from 0.01 to 2% of said refractory material by weight.

References Cited in the file of this patent

UNITED STATES PATENTS

| Number | Name | Date |
| --- | --- | --- |
| 2,313,674 | Salzberg | Mar. 9, 1943 |
| 2,424,895 | Noyes | July 29, 1947 |
| 2,425,118 | Noyes | Aug. 15, 1947 |
| 2,491,096 | Feagin | Dec. 13, 1949 |
| 2,521,614 | Valyi | Sept. 5, 1950 |
| 2,522,548 | Streicher | Sept. 19, 1950 |
| 2,544,598 | Kalina | Mar. 6, 1951 |